(12) United States Patent
Lorrillard et al.

(10) Patent No.: US 10,655,250 B2
(45) Date of Patent: May 19, 2020

(54) WOVEN PREFORM FOR PRODUCING A CIRCUMFERENTIAL OR TOROIDAL REINFORCEMENT HAVING AN OMEGA-SHAPED CROSS-SECTION

(71) Applicant: AIRCELLE, Gonfreville l'Orcher (FR)

(72) Inventors: Julien Lorrillard, Le Havre (FR); Bertrand Desjoyeaux, Sainte Adresse (FR); Michel Rognant, Le Havre (FR); Benjamin Provost, Montivilliers (FR)

(73) Assignee: Aircelle, Gonfreville l'Orcher (FR)

( * ) Notice: Subject to any disclaimer, the term of this patent is extended or adjusted under 35 U.S.C. 154(b) by 470 days.

(21) Appl. No.: 15/262,029

(22) Filed: Sep. 12, 2016

(65) Prior Publication Data
US 2016/0376735 A1    Dec. 29, 2016

Related U.S. Application Data

(63) Continuation-in-part of application No. PCT/FR2015/050592, filed on Mar. 10, 2015.

(30) Foreign Application Priority Data

Mar. 10, 2014  (FR) .................................... 14 51946

(51) Int. Cl.
*D03D 25/00* (2006.01)
*D03D 1/00* (2006.01)
(Continued)

(52) U.S. Cl.
CPC ............ *D03D 25/005* (2013.01); *B29B 11/16* (2013.01); *D03D 1/00* (2013.01); *D03D 11/02* (2013.01);
(Continued)

(58) Field of Classification Search
CPC ..... B29B 11/00–16; B29B 2911/14406; B29C 70/222; B29C 70/24; D03D 1/00; D03D 3/08; D03D 7/00; D03D 11/00–02; D03D 13/002–004; D03D 25/005; D03D 49/20; D03D 2700/0118; D03D 2700/0155;
(Continued)

(56) References Cited

U.S. PATENT DOCUMENTS 836,642 A    11/1906   Fisher
962,331 A    6/1910    Fisher
(Continued)

FOREIGN PATENT DOCUMENTS

| DE | 102008028865 | 12/2009 | |
|---|---|---|---|
| DE | 102010030550 | 12/2011 | |
| EP | 2769885 A1 * | 8/2014 | ........... B60R 21/235 |

OTHER PUBLICATIONS

Mukhopadhyay, Madhujit. "12.7.2 Types of Composite Stiffeners." Mechanics of Composite Materials and Structures, Universities Press (India) Private Limited, 2004, p. 340. (Year: 2004).*

(Continued)

*Primary Examiner* — Laura C Powers
*Assistant Examiner* — Larissa Rowe Emrich
(74) *Attorney, Agent, or Firm* — Burris Law, PLLC

(57) ABSTRACT

The disclosure relates to a shape-woven preform which has an omega-shaped cross-section including a core and a sole. At least one part of the core and at least one part of the sole have weft yarns in common with one another.

20 Claims, 9 Drawing Sheets

(51) Int. Cl.
*D03D 11/02* (2006.01)
*D03D 13/00* (2006.01)
*D03D 49/20* (2006.01)
*B29B 11/16* (2006.01)

(52) U.S. Cl.
CPC ............ *D03D 13/002* (2013.01); *D03D 49/20* (2013.01); *D10B 2403/023* (2013.01); *D10B 2505/02* (2013.01); *D10B 2505/12* (2013.01)

(58) Field of Classification Search
CPC .. D03D 2700/0196; D03D 11/02; D03D 3/00; D03D 13/00; D03D 13/004; D10B 2401/063; D10B 2403/023; D10B 2403/033–0331; D10B 2505/02; D10B 2505/12; D10B 2505/00; Y10T 428/1352; Y10T 428/1359–1362; Y10T 428/1369; Y10T 428/1393–1397; Y10T 428/17; Y10T 428/24033; Y10T 428/24058; Y10T 428/24074–24116; Y10T 428/24298; Y10T 428/24314; Y10T 428/24744; Y10T 442/2361–2369; Y10T 442/2926; Y10T 442/3179–3317; B32B 5/024

USPC ...... 428/35.7, 35.9–36.1, 36.3, 36.91–36.92, 428/53, 102, 105, 107–112, 134, 136, 428/188, 542.8; 442/103–104, 172, 442/203–220
See application file for complete search history.

(56) References Cited

U.S. PATENT DOCUMENTS

| 4,379,798 | A | * | 4/1983 | Palmer | B29C 70/24 428/113 |
| 4,668,545 | A | * | 5/1987 | Lowe | B29C 61/0658 139/387 R |
| 5,100,713 | A | * | 3/1992 | Homma | B29C 70/10 139/383 R |
| 2007/0232171 | A1 | * | 10/2007 | Maki | B29C 70/24 442/205 |
| 2013/0108417 | A1 | | 5/2013 | Renon | |
| 2013/0270389 | A1 | * | 10/2013 | Godon | B29B 11/16 244/54 |
| 2013/0344291 | A1 | * | 12/2013 | Pearson | B29C 70/865 428/157 |

OTHER PUBLICATIONS

International Search Report for International Application PCT/FR2015/050592, dated Jun. 15, 2015.

* cited by examiner

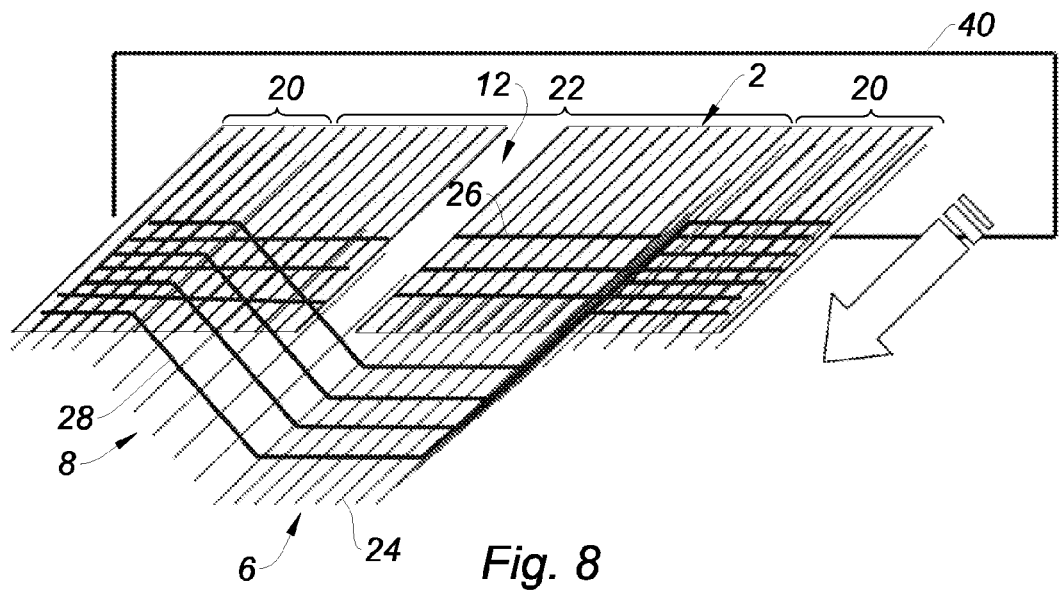
Fig. 8
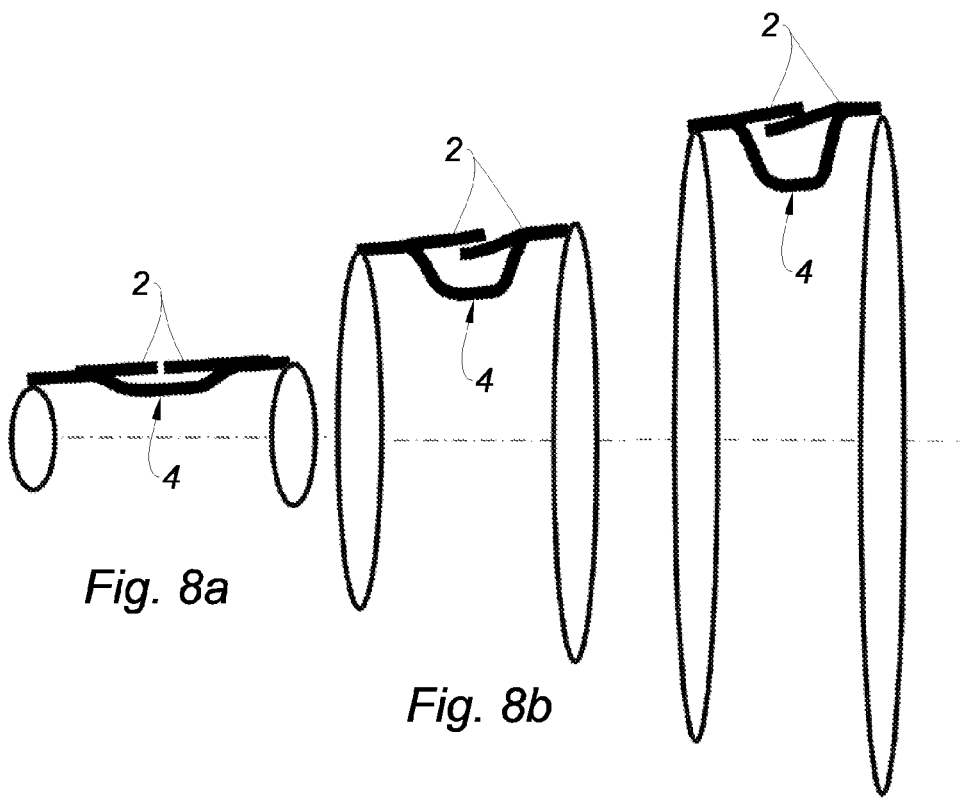
Fig. 8a
Fig. 8b
Fig. 8c

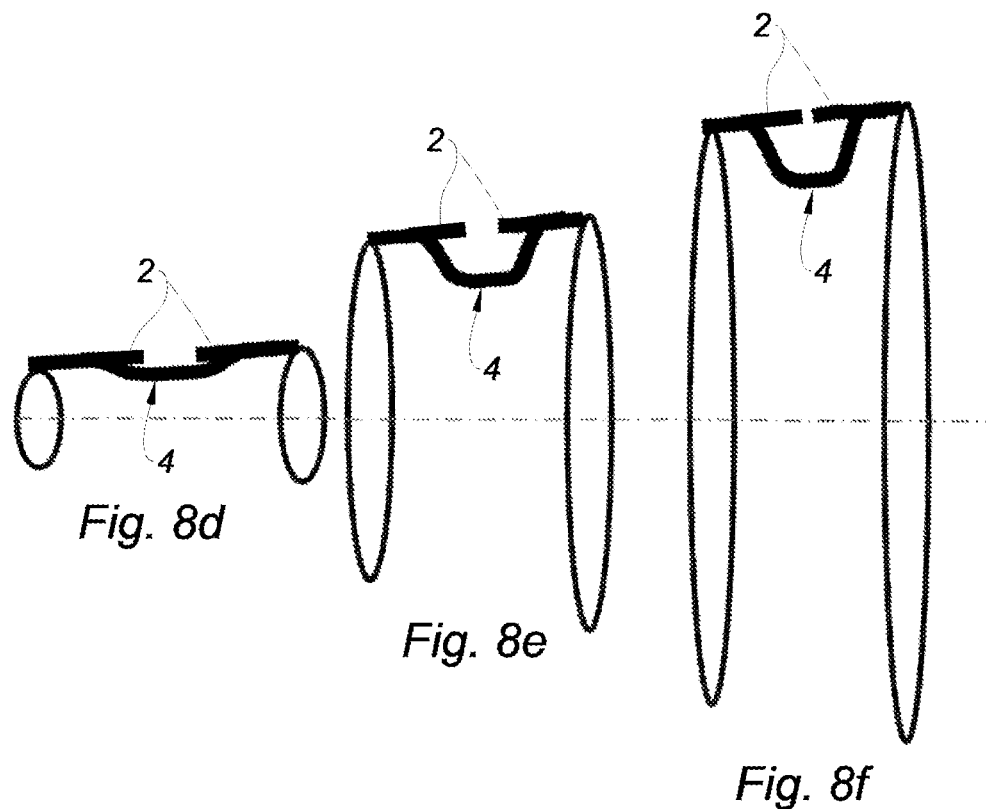
Fig. 8d
Fig. 8e
Fig. 8f
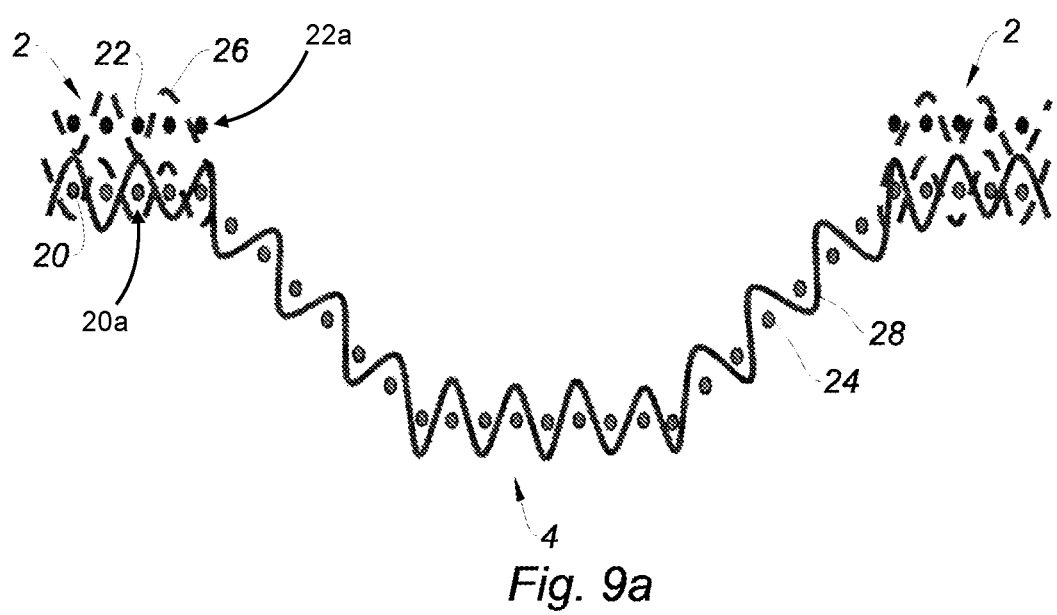
Fig. 9a

WOVEN PREFORM FOR PRODUCING A CIRCUMFERENTIAL OR TOROIDAL REINFORCEMENT HAVING AN OMEGA-SHAPED CROSS-SECTION

CROSS-REFERENCE TO RELATED APPLICATIONS

This application is a continuation in part of International Application No. PCT/FR2015/050592, filed on Mar. 10, 2015, which claims the benefit of FR 14/51946 filed on Mar. 10, 2014. The disclosures of the above applications are incorporated herein by reference.

FIELD

The present disclosure concerns a woven dry preform for making an omega-shaped reinforcement by resin impregnation, a stiffener obtained with such a preform, and a weaving system provided to make such a preform.

BACKGROUND

The statements in this section merely provide background information related to the present disclosure and may not constitute prior art.

In order to make resistant and light structural members, in particular for the aeronautical field, it is known to prepare a dry fabric preform comprising for example carbon fibers, which is impregnated with a resin, in particular by an injection method called "RTM" (Resin Transfer Molding).

There is thus obtained, after baking to polymerize the resin, a member comprising fibers whose density and orientation are locally adjusted, in order to obtain mechanical resistance features adapted for the stresses applied to this part.

In particular, it is possible to make, by means of this technique, skin-shaped parts bent about an axis such as axisymmetric shrouds and including at least one circumferential stiffener giving rigidity to this skin: such a skin may be used, in particular in manufacturing an aircraft engine nacelle.

In some cases, the stiffening function is ensured by a member having a constant cross section substantially resembling an omega ("Ω"), comprising a core (the round portion of the omega) and a sole (the extended base of the section of the omega).

For making the assembly formed by the bent skin to be stiffened and the omega-shaped stiffener, it is known to separately make the skin and the stiffener which are pre-baked, then assembled by a mechanical connection or bonding.

It is also known to make one of these members by pre-baking, then to set up the dry preform of the second member on this first member in order to carry out its impregnation then its baking, which assembles them at the same time.

Finally, it is known to make two separate preforms, with simultaneous impregnation and baking of these two preforms put into position relative to each other.

However, these solutions do not provide a strong binding between the core and the sole of the omega-shaped stiffener. Therefore, there is obtained a reduced mechanical aspect, with an adhesion failure risk by peeling in case of traction on the core or on the sole of the stiffener.

Alternatively, the stiffener may be incorporated into the skin to be stiffened by hand-made drapings of flat fabrics.

However, this operation requires a significant workforce, resulting in additional costs. Furthermore it requires many fabric cuttings, and the orientation of fibers is not optimized.

SUMMARY

The present disclosure provides a textile preform in particular adapted for an omega-shaped stiffener profile and for the bent shape of the skin to be stiffened.

It provides for this purpose a woven preform by shape weaving, having an omega-section comprising a core and a sole, noteworthy in that at least one portion of said core and at least one portion of said sole comprise weft yarns which cross each other on common warp yarns.

The preform according to the present disclosure thus includes an intimate binding between the core and the sole of the stiffener. This woven binding allows countering the effects of peeling which tend to take the core apart from the sole of the stiffener.

The interior of the omega-shaped stiffener (volume comprised between the core and the sole) may be hollow or bulk.

An advantage of this woven preform is that, in a single operation which may be industrially easy and fast, there is obtained a continuous weaving of the core and the sole of the preform which are then shaped on tooling to the geometry of the final part including the device for keeping in shape the core of the stiffener (core or counter-shape tooling and bladder, foam shape, etc.), then impregnated with resin, in order to constitute, after baking, a very homogeneous assembly whose at least one portion of the weft yarns ensures a strong binding between the core and the sole of the stiffener.

Another advantage of such a preform is that the shape weaving joining the assembly of the surfaces predisposes the preform to match the shape for which it was designed by controlling the relative orientations of fibers.

The woven preform according to the present disclosure may further include one or more of the following features, which may be combined therebetween:
- the wefts of the sole bind the warps of the lateral portions of the sole to the warps of the central portion of the sole and the wefts of the core bind said warps of the lateral portions of the sole to the warps of the central portion of the core;
- some wefts of the sole bind a warp sheet of the lateral portions of the sole to the warps of the central portion of the core, and other wefts bind another warp sheet of the central portions of the sole to the warps of the central portion of the core;
- some wefts of the sole bind at least one warp sheet of the lateral parts of the sole at least one warp sheet of the central portions of the sole, and other wefts bind each of said warp sheets of the sole to the warps of the central portion of the core;
- said core comprises a superposition of fabrics whose warp sheets are at least partially bound therebetween;
- said sole comprises a superposition of fabrics whose warp sheets are at least partially bound therebetween;
- said core comprises a superposition of fabrics attached to each other by interlocking of correspondingly shaped fabrics;
- said sole is formed of two portions separated from each other;
- said two portions partially overlap;
- said two parts are separated from each other so as to define a slot;
- said core is located in the concavity of said preform;
- said core is located on the convex portion of said preform;

the weft yarns of said core form an angle different from 90° with at least one portion of the warp yarns of said core;

said sole or said core, or both, further comprise a superposition of fabrics attached on each other by draping;

at least some of the members of fabrics or of the preform are bound by stitching;

different portions of preforms and additional pleats may be stitched therebetween in order to reinforce their cohesion.

The present disclosure also relates to a stiffener, noteworthy in that it is obtained by resin impregnation, then baking of a preform in accordance with the above.

The present disclosure also relates to a method for manufacturing a preform in accordance with the above, noteworthy in that this preform is made by contour weaving on a lap roller having a groove or a overgrowth (according to the concave or convex face of the shroud on which the stiffener bears), with an independent specific member allowing the shape weaving of the core and the sole of the preform.

According to other optional features of this method:

the sides of said preform are tightened in order to reduce the width of this substantially cylindrically woven preform, while increasing the winding diameter of said core and of said sole;

said sole is cut at the outlet of the loom to be woven in order to form said central slot;

said sole is made by at least two additional lateral warp sheets unbound from the weft yarns of the core of the preform, then these lateral portions are unpleated towards the center of the preform.

The present disclosure also relates to an axisymmetric shape in particular for aircraft nacelle, noteworthy in that it is reinforced by at least one stiffener in accordance with the above.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 8 shows in perspective view a second weaving mode of the preform;

Figure 9B:
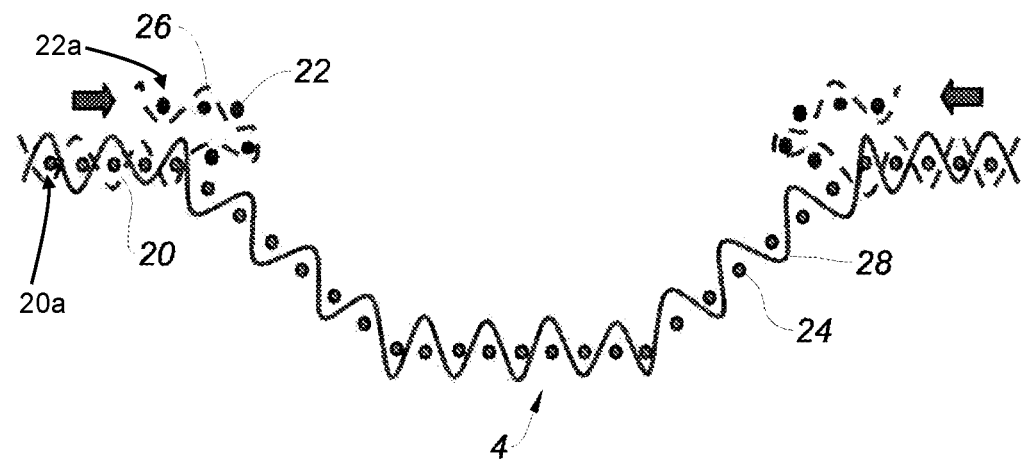
Figure 9C:
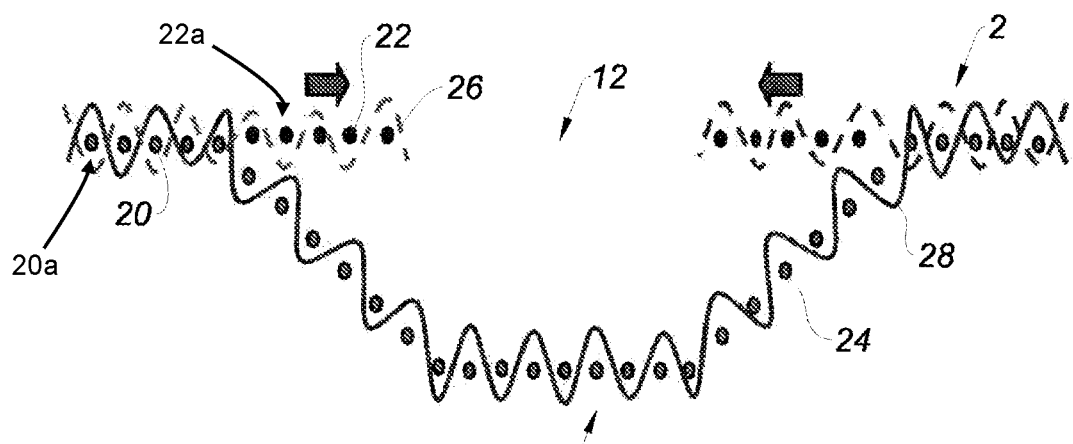
Figure 10A:
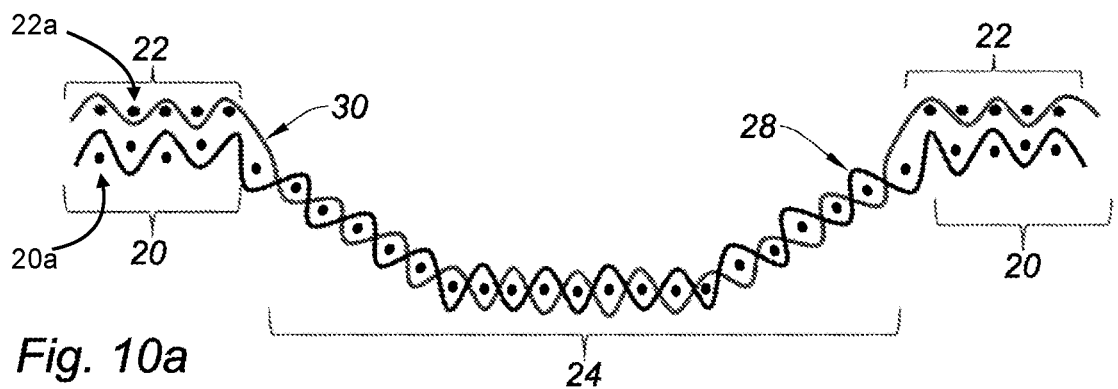
Figure 10B:
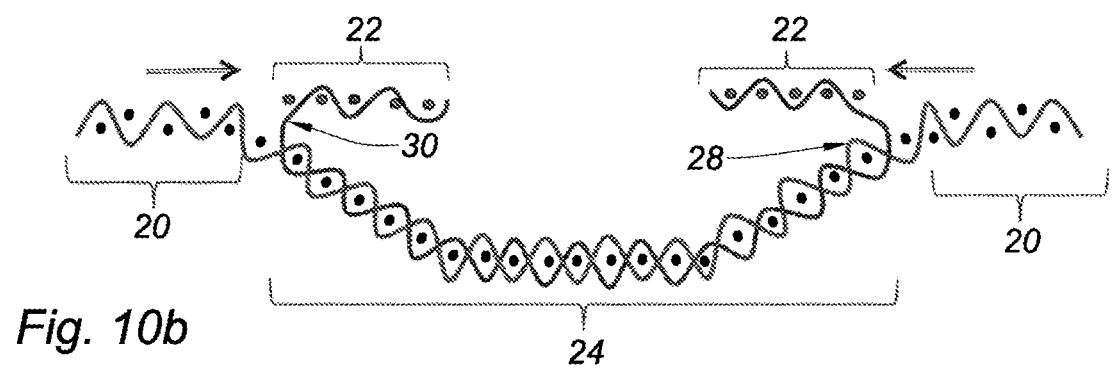
Figure 11A:
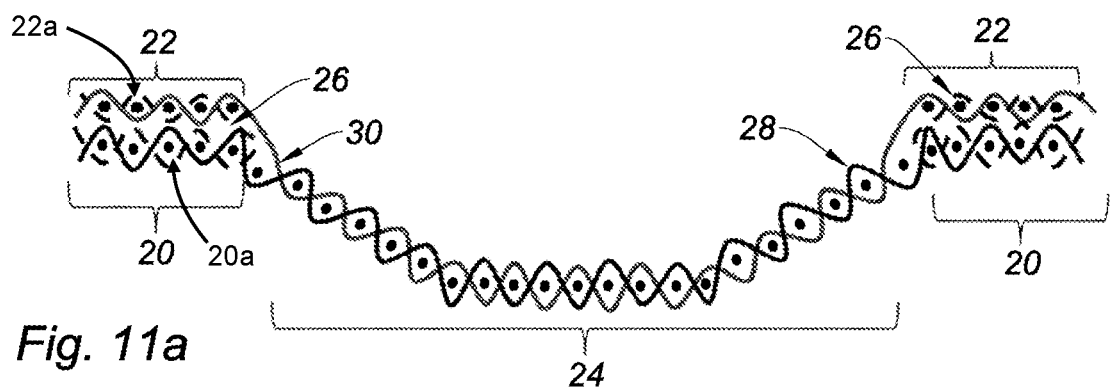
Figure 11B:
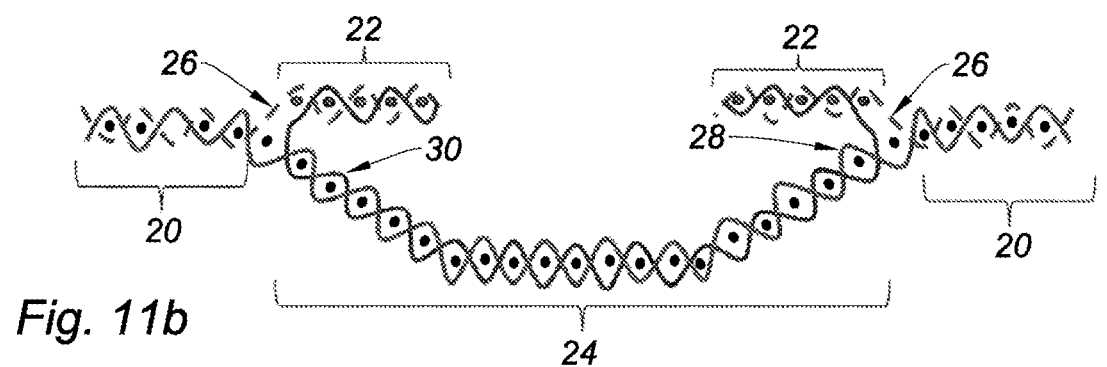
Figure 12:
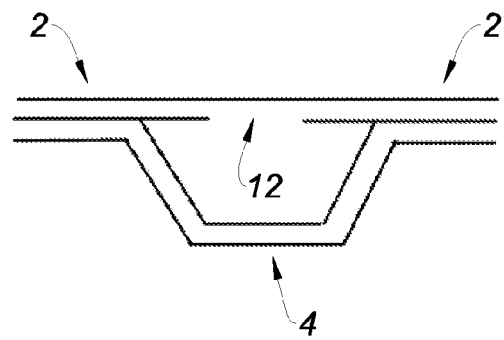
Figure 13:
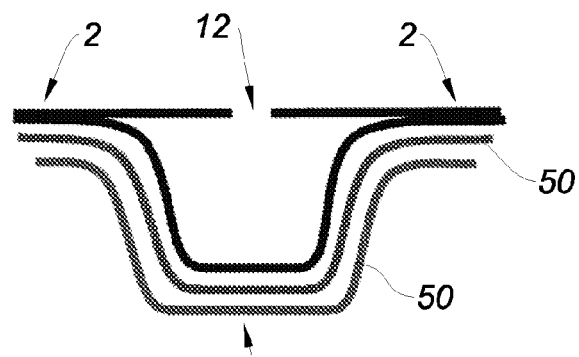
Figure 14:
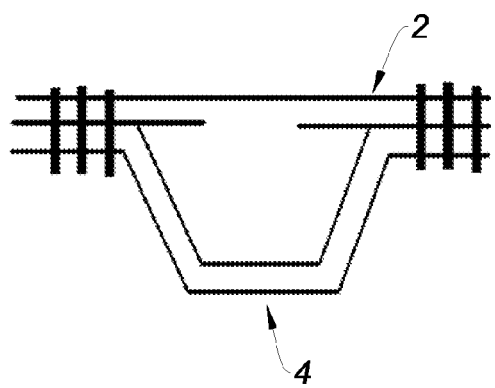

FIGS. 8a to 8c, and 8d to 8f show successive steps of shaping of this preform;

FIG. 9a is a sectional diagram of the weaving of the preform, according to a variant of the second form of the present disclosure;

FIGS. 9b and 9c show in cross-sectional view two successive steps of subsequent shaping of the weaving of this variant;

FIGS. 10a and 10b show a cross-sectional diagram of the weaving of the preform, according to another variant of the second form of the present disclosure and its deployment;

FIGS. 11a and 11b show a sectional diagram of the weaving of the preform according to a third form of the present disclosure and its deployment; and FIGS. 12 to 14 are cross-sectional diagrams of weavings according to other variants.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1A:
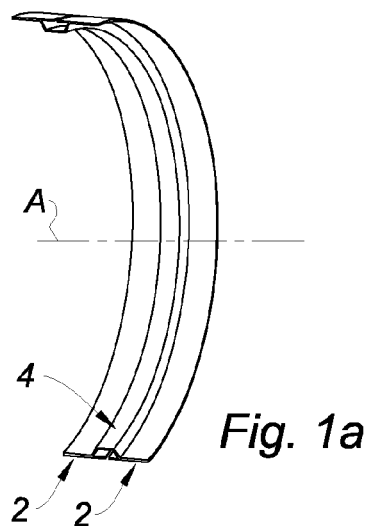
FIGS. 1a and 1b are overview and detail view of a stiffener obtained with a woven preform according to the present disclosure.
Figure 1B:
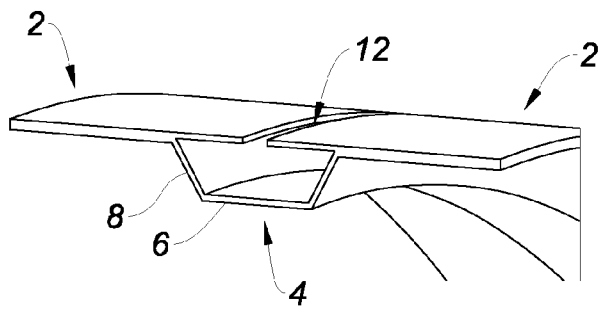

FIGS. 1a and 1b show an omega-shaped section stiffener, also commonly referred to as a "hat" stiffener, according to the present disclosure, intended to be fastened to the inside (that is to say concave face stiffener) of a skin to be stiffened (not shown) bent about an axis, such as a portion of an axisymmetric shroud or an entire shroud.

In the example shown, this stiffener has a slot 12 disposed in a plane perpendicular to the bending axis A, which separates two portions of sole 2 bound therebetween by the core 4 of the stiffener.

As it may be seen in particular in FIG. 1b, the core 4 of the stiffener substantially shows a U-section, comprising a bottom 6 and two inclined wings 8.

Figure 2A:
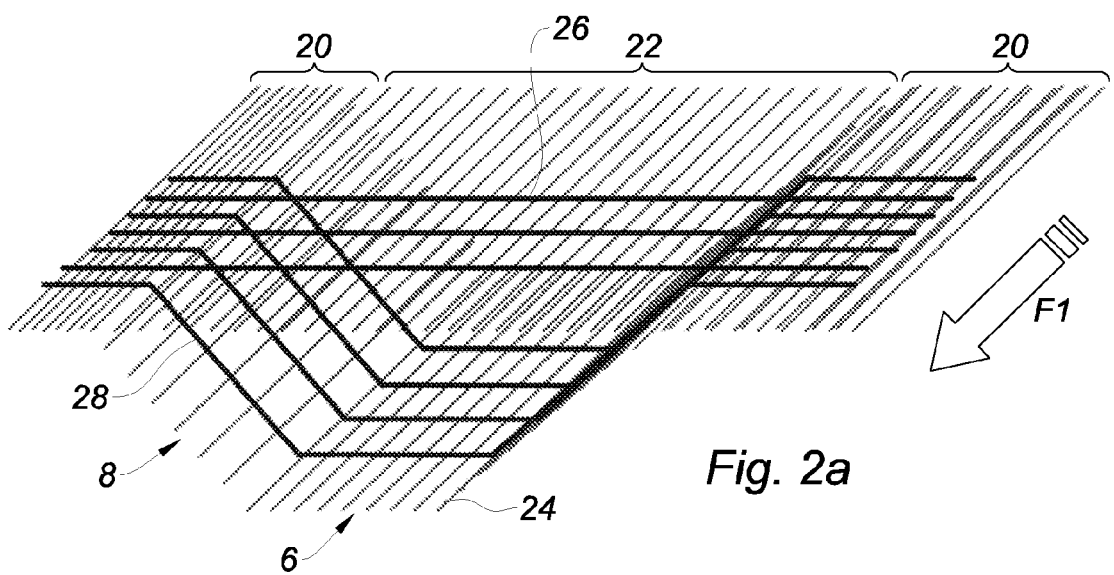
FIGS. 2a and 2b are organizational diagrams of the yarns of a first weaving mode of this preform, including at the output of this weaving a sole integrally formed, FIG. 2a showing in perspective view the distribution of the warp sheets, and FIG. 2b showing in sectional view an arrangement of interlacing of yarns perpendicular therebetween.
Figure 2B:
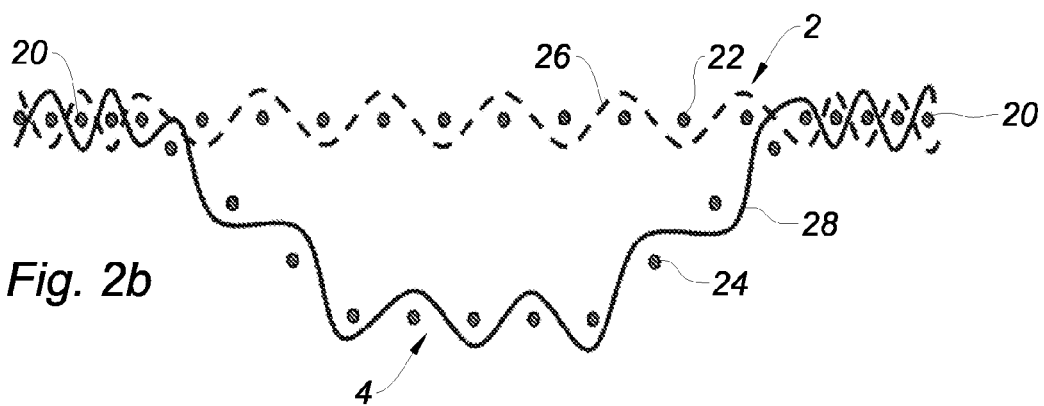

FIGS. 2a and 2b show in linear folded views and in cross-sectional view an example of weaving mode of the preform allowing making the stiffener of FIGS. 1a and 1b, which is continuously woven with an advance indicated by the arrow F1.

FIG. 2a shows the organizational diagram of the yarn sheets. The weaving includes different warp sheets comprising in the plane of the sole 2, two lateral portions comprising common warp yarns 20 for the weft yarns 26 of the sole 2 of the preform and for the weft yarns 28 of the core 4 of the preform.

FIG. 2b shows an example of interlacing of weaving between warp yarns and weft yarns in a taffeta of canvas type pattern.

In the central portion of the preform, the warp yarns 22 of the sole 2 and the warp yarns 24 of the core 4, form two separate fabric sheets with the respective weft yarns 26 and 28.

There is obtained a preform whose lateral edges of the sole 2 are strongly bound to the core 4 by the intersections of two series of weft yarns 26, 28 with the warp yarns 20 of these lateral portions.

Figure 3:
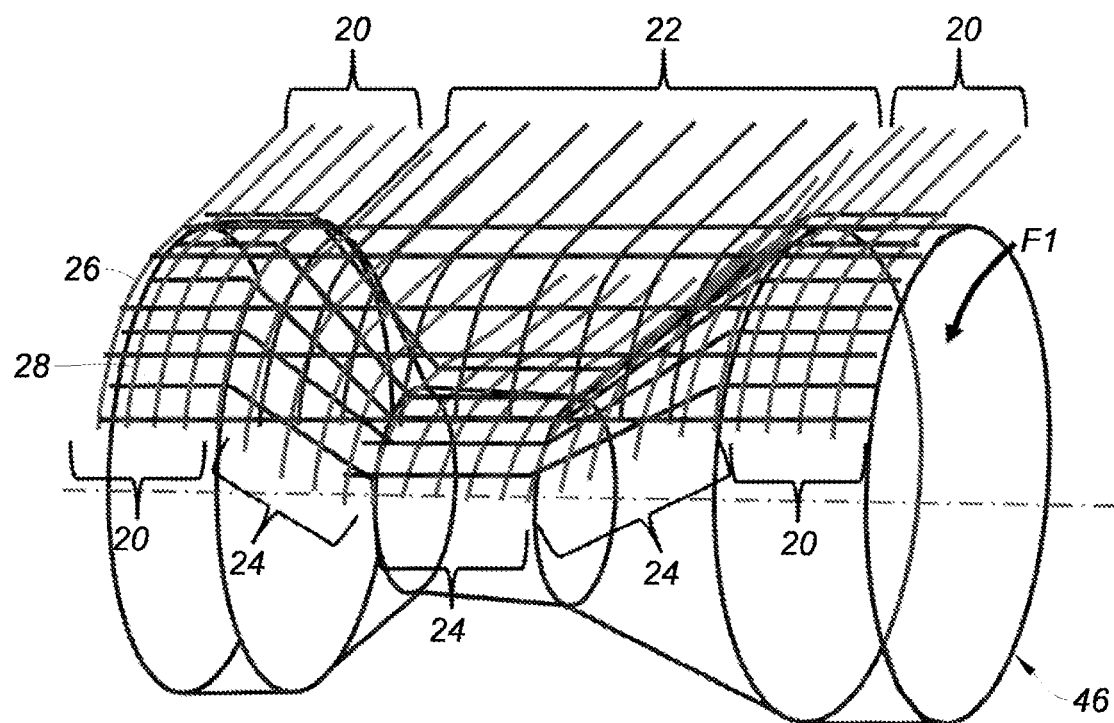
FIG. 3 shows a perspective view of the preform winding on an axisymmetric shape characteristic of the shape weaving.

FIG. 3 shows the shape view of the preform with the different groups of yarns. The shown revolution lap roller 46 illustrates the general shape of the preform.

The preform is woven by shape weaving.

More particularly, the preform is woven by shape weaving around a revolution part.

Shape weaving means a weaving made on a revolution part of non-linear generator, herein the lap roller 46. This type of shape weaving allows in particular obtaining circumferential yarns of different lengths, herein warp yarns.

Figure 4:
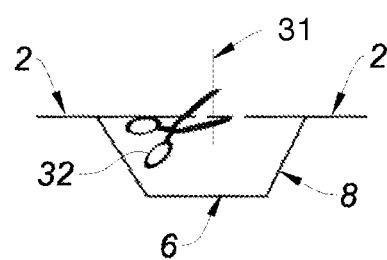
FIG. 4 shows the cutting of the sole into two portions.

FIG. 4 shows a subsequent step which continuously make with a cutting tool 32 a cutting 31 of the yarns 26 of the central portion of the sole in order to form the slot 12.

Figure 5A:
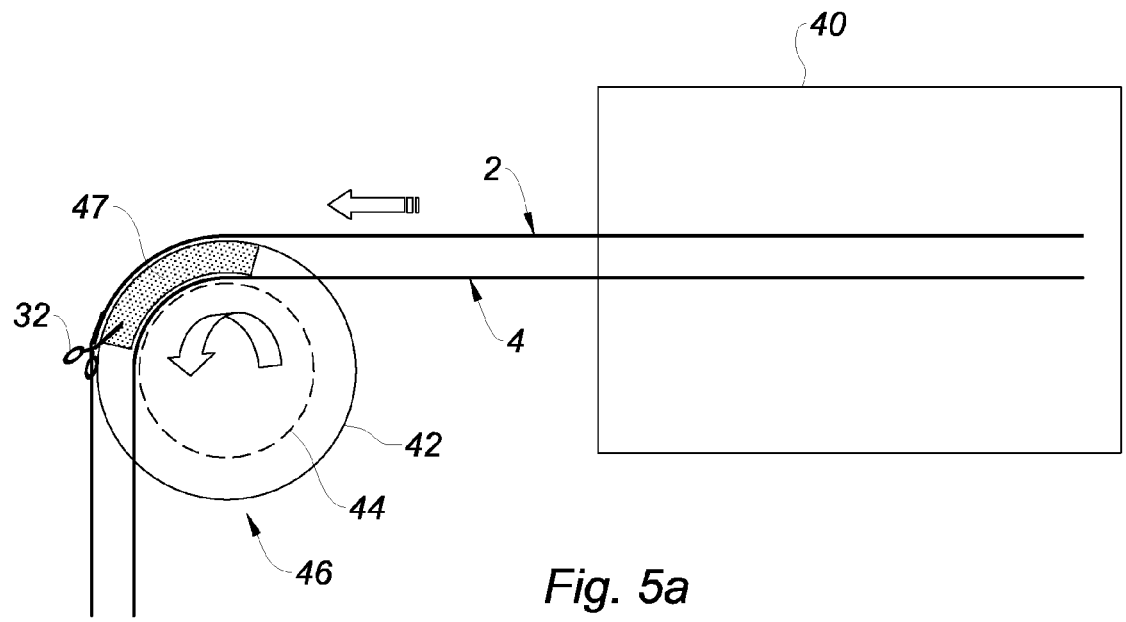
FIGS. 5a, 5b and 6a, 6b show a method for shape creation of the preform associated to the weaving, comprising respectively the side views of the assembly, and the views of the shaping lap roller for concave face or convex face stiffeners of axisymmetric surface.
Figure 5B:
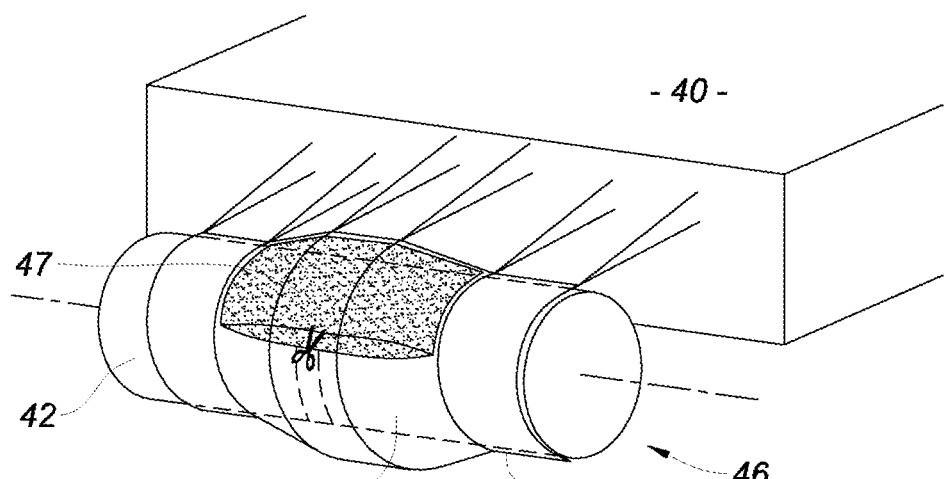

FIGS. 5a (respectively 5b) and 6a (respectively 6b) have a loom to be woven 40 which continuously produces the preform, winding around a lap roller 46 comprising a central circular groove 44 having a profile allowing making the core 4 of the preform and an additional sector 47 for forming the central portion of the sole 2 above the core 4, (respectively a lap roller 46 allowing forming the sole 2 and an additional sector 47 to form the core of the stiffener).

The shape weaving thus made confers to the preform a predisposition to match an axisymmetric shape such as a shroud with a circumferential stiffener called omega-shaped stiffener, without pleats or distortion or slidings of the yarns.

In practice, it is difficult to weave a preform of this type at once if the wings 8 of the core form a too large angle with the bottom 6 or with the lateral portions of the sole 2.

In practice, it is desirable that this angle does not exceed 30°, or even if possible does not exceed 15°. When the diameter of the shroud for which the preform is intended, is significant or that the angles of the wings 8 of the core of the omega-shaped stiffener are significant relative to the sole 2, the profile of the lap roller 46 is not that of the part, but there is a kind of similarity, as known in the field of the shape weaving, also known as "contour weaving" the lengths of section segments of the lap roller 46, are the same as on the preform of the stiffener deployed on the part to be molded, and for each point of all these segments, the ratio of the radius of the part to be molded to the radius of the lap roller is constant.

Such a weaving technique allows making left preforms, that is to say three-dimensional woven members having a curvature in the space.

In particular, on the lap roller 46 there is a cylindrical groove bottom 44 in which the bottom 6 of the core of the preform fits, comprising two inclined sides in which the inclined wings 8 of this core fit, this groove being framed by two cylindrical cores 42 accommodating the sole 2 of the stiffener. The lap roller 46 and the additional member 47 perform the shaping of the weaving of the outgoing from the loom to be woven 40.

The member 47 must cover a minimum lap roller angular sector to ensure the return of warp yarns depending on the diameter appropriate to its outer shape, so that the weaving it supports has the defined shape. In one form, it will cover at least an angle of 30°. In another form, it will cover at least an angle of 45°. And yet in another form, it might be at least an angle of 80°.

When measuring the production of the weaving of the preform, the latter must be displaced relative to this member 47. To do this, it is possible to maintain the member stationary relative to the loom, the preform only sliding on the outer surface of the member as and when rotating the lap roller 46. In another form of the loom, the member 47 will have a sequential and reciprocating movement in rotation, sometimes rotating with the lap roller 46, sometimes performing a rotation of reverse angular value in order to bring it back to its original position.

The length of the segment 47 will be chosen depending on the weaving or interlacing density between the warp sheets of the core and the sole by the weft sheets so that the shape of the preform is stabilized beyond the member 47. In particular in the case of textiles for aeronautical structural applications, the woven fiber tufts (often carbon fibers and/or glass fibers, or ceramic fibers) have widths ranging from a few tenths of millimeters to a few millimeters, there is then found fiber densities of the range of 2 to 10 fibers per cm. A length of 5 to 10 cm of woven preform provides sufficient interlacing between fibers in order to provide a good weaving stability.

A member 47 whose perimeter along which the warp yarns are held of at least a few centimeters then meets the stabilization objective of the preform shape before releasing the shape 47 and any possible spacing of the lap roller 46.

The cutting tool 32 is disposed at the outlet of the lap roller 46, in order to continuously perform the cutting of the central portion of the sole in order to form the slot 12.

Figure 7:
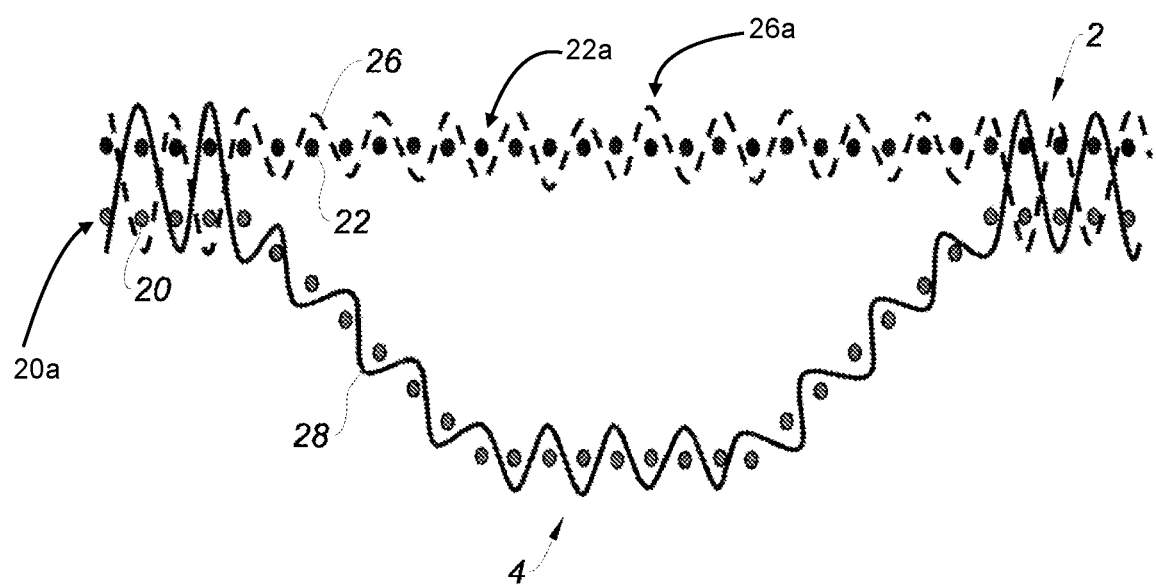
FIG. 7 is a sectional diagram of the weaving of the preform, according to a variant of the first form of the present disclosure.

FIG. 7 shows another weaving variant, which differs from that of FIG. 1 in the fact that the warp sheet 22a (made up of warp yarns 22) defining the sole 2, is superposed to the lateral portions of the warp sheet 20a (made up of warp yarns 20, 24) whose central portion defines the core of the preform.

The weft yarns 26 and 28 cross, for its part, at the same time as the lateral portions of the weft sheet 26a (made up of weft yarns 26) and the warp sheet 20a. In this way a very good cohesion between the sole 2 and the core 4 of the preform is obtained, and the amount of warp fibers in these areas is increased.

Figure 6A:
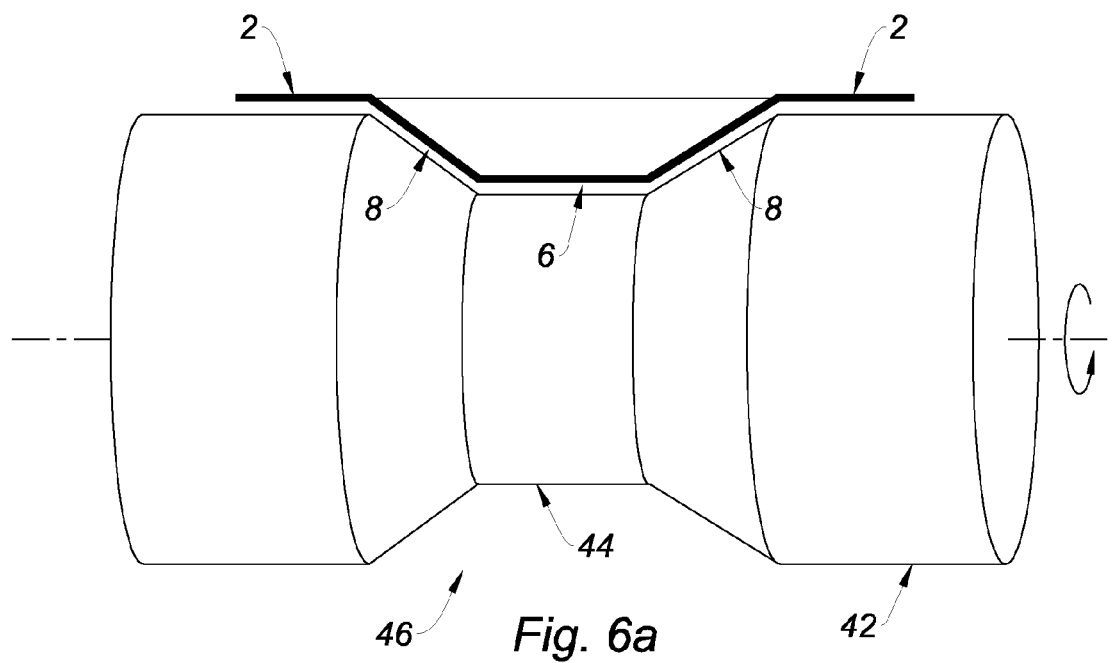
Figure 6B:
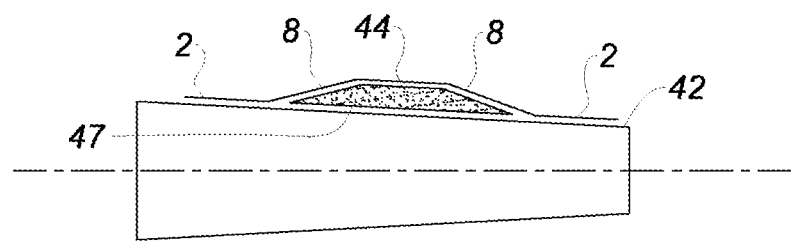

It will be noted that the shapes of shroud revolution section, respectively of stiffeners, are given by way of example and are not necessarily straight respectively trapezoidal, but may have curvilinear shapes. For example, the lap roller 46 shown in FIG. 6b, has a conical shape corresponding to a conical shroud to be draped with the preform woven according to the present disclosure. It might have also a barrel shape. Similarly, the shape of the core 4 provided in flare-shaped U, may have a wavy shape.

FIG. 8 shows the organizational diagram of a second form of a weaving including a sole 2, which is produced in two parts in order to directly form the central slot 12 during this weaving. At the slot 12, the sole 2 does not include warp yarns, and the weft yarns 26 of the sole 2 are separately inserted in order to separately weave each of the portions of the sole, in order to obtain an already formed slot. The setting up of the tool 32 is thus avoided.

In the most common application of the present disclosure, the preform is intended for a shroud of a diameter larger than the lap roller 46. FIGS. 8a to 8c show the shape transformation of the stiffener as and when extending the winding diameter of the sole of the preform from those seen on the lap roller (FIG. 8a) to those expected on the part to be molded (FIG. 8c).

The matching of a shape to another meets the rules for compliance with respective diameters ratio at any point of a section of the preform and with conservation of length of transverse segments. The increase in winding diameter results in the recovery of the wings 8 of the core and the increase of the angles between the wings 8 and the bottom 6 or the sole portions.

In the case of FIGS. 8a to 8c, the initial slot between the two sole portions is narrow during the weaving of the preform, which causes, when deploying the preform, an overlapping of the two central portions of the sole 2.

FIGS. 8*d* to 8*f* show a variant for which the slot made during the weaving is larger, the central portions of the sole do not overlap when increasing the diameter of the preform.

When the shroud shape supporting the stiffener is substantially cylindrical, the winding diameters of the set of warp yarns 20 and 22 are substantially identical. It is then possible to make the preform according to the present disclosure according to other forms allowing avoiding the resort to the separate member 47 associated with the lap roller 46, and only require a lap roller 46, of the adapted shape.

FIGS. 9*a* to 9*c* show another variant of the same weaving mode of the preform in which the sole 2 is made in two separate bands to form the central slot 12.

In this variant, the warp sheet 22*a* is separated into two portions, each of which being superposed with the warp sheets 20*a* on each of the lateral portions.

As in the first form, a first weft yarn 28 crosses all the yarns of the warp sheet 20*a* for binding the core of the stiffener and the lateral portions of the sole. The weft yarns 26, according to a first transverse path, are woven with lateral warp yarns 20, and in a second transverse path outwards, are woven with the superposed warp yarns 22.

The sole 2 is thus formed by two pleated portions each one on itself.

FIGS. 9*b* and 9*c* show the deployment of these two portions of the sole 2, by pushing each of these two portions towards the center as indicated by the arrows.

FIG. 9*c* shows the two portions of the sole 2 completely deployed, which thus form this sole becoming flat, comprising the central slot 12. We have, in the same manner as in the preceding variants, a very good cohesion between the sole 2 and the core 4 of the preform of the stiffener.

FIG. 10*a* shows a third form of the preform according to the present disclosure in which the warp sheets 22*a* are distributed superposed on the warp sheets 20*a* and the weft yarns 28 of the core are woven with the warp yarns 20, and other weft yarns 30 of the core are woven, on the other hand, with the warp yarns 22. Only a weft yarn 28, respectively 30 is shown in FIG. 10*a*, but, of course, according to different weft columns by any weaving pattern known to those skilled in the art, it is possible to ensure the binding of the set of warp yarns of each sheet with the set of the associated weft yarns.

As in the variant of FIGS. 9*a* to 9*c*, it is then performed by the reversal of the woven portions with the warp sheets 22*a*, in order to form the central portion of the sole of the stiffener, as shown in FIG. 10*b*. In this case the weft fibers of the core 28 and 30 bind the two portions of the soles with the warp yarns 20 and 22.

FIG. 11*a* shows another form of the preform according to the present disclosure in which the weft yarns bind, in groups of two, the three section portions of the preform. The section of the omega is composed of three portions: the core 4 covered by the warp yarns 24, the outer sole portions covered by the warp sheets 20*a*, and the sole central portions covered by the warp sheets 22*a*.

As in the variant of FIG. 9*a*, the weft yarns 26 bind the warp yarns 20 and the warp yarns 22 according to a shuttle weaving mode of the weft yarn coming back to the end of the warp sheets 20*a* and 22*a* close to the core 4.

As in the form of FIG. 10*a*, other weft yarns 30 bind the warp yarns 24 of the core 4 and the warp sheets 22*a* on the one hand, and other weft yarns 28 bind the warp yarns 24 of the core 4 and the warp sheets 22*a* of the central portion of the sole 2.

Thus, an extremely coherent bound assembly between the different parts of the stiffener is obtained. As in the variant of FIGS. 9*a* to 9*c* the reshaping of the sole 2 is obtained by the reversal the woven parts binding the warp sheets 22*a* as shown in FIG. 11*b*.

The examples of interlacings between weft yarns and warp yarns are given for information in the previous figures. Those skilled in the art may consider weavings according to different possible known patterns, such as twill taffetas or satin. Attention might be given on the pattern in the vicinity of the connection between the core and the sole, in particular by preferring patterns in which the paths of the wefts are balanced in the thickness in order to limit any possible overlengths or over voltage of the weft yarns, in particular in the variants requiring the reversal of the weavings of the central portion of the sole.

The method according to the present disclosure also allows making preforms whose weft yarns have on all or part of the width of the preform a certain orientation relative to the warp yarns different from 90° (for example 45°).

For this, we consider the different steps between the shape weaving and the final shape of the part including these wefts inclined at an angle different from 90° relative to the warp yarn.

The first step consists in pivoting the inclined weft yarns to bring them at 90° relative to the warp yarns while retaining the weft yarn length between two warps, thus the sections of the different warp columns are then more spaced by a factor of 1/cos(initial angle to angle 90°)×the initial distance.

In this new shape transversely dilated, there is then applied, if necessary the transformation of the diameters of lap rollers of the different warp columns according to the rules adapted for the shape weaving, or a single reduction factor of all diameters of the shape, and an increase of the spacing between the different diameters so that each weft length necessary to bind these different warp columns carrier diameters remain identical to that on the final shape.

After weaving, the deployment and the unstraining or shearing of angles of weft yarns relative to the warp yarn in the considered areas, added to the application to the shape of the desired part, will then reproduce the desired angle.

Other complementary variants of the form of the preform may optionally be added to the previous ones, in particular to obtain a thicker preform in some areas while producing a preform at once.

It is possible to have several layers of warp sheets (i.e., made up of warp yarns 24) in the area of the core 4 which are then bound by one or more layer(s) of weft yarns 28 or 30 according to, for example a multilayer weaving mode of the layer-to-layer or multilayer interlock type.

It is possible to have several layers of warp sheets 20*a* in one or both lateral portions of the sole 2, bound by one or more layers of weft yarns 28, 30 or 26.

It is possible to have several layers of warp sheets 22*a* in the one or both central portion(s) of the sole 2, bound by one or more layers of weft yarns 26.

The multilayer weaving then confers to said area even more binding between the fibers and allows producing, at once, the preform reducing the number of fabrics to be disposed in the molding shape for making the part.

Depending on the stresses placed on the part, it may be useful to complete the draping of the shape by joining to the preform according to any of the different preceding variants or combination of several of these variants of successive layers. By way of non-limiting examples, FIGS. 12 to 14 show preforms of stiffeners obtained by combining the preforms according to the present disclosure with other techniques.

FIG. 12 shows a sectional diagram of an example of preform which may be obtained for example by starting from the preform obtained according to any of the preceding methods, on the sole of which fabric pleats are superposed by any conventional method, or by a shape weaving method, such as a draping method.

FIG. 13 shows a variant in which a preform is made according to any of the preceding methods, other preforms 50 also made by contour weaving, which can optionally have different orientations of weft yarns (for example ±45°) are then attached on the preform by interlocking in order to provide optimal resistance to the forces to which the stiffener will finally be submitted.

It should be noted that it is possible to consider combining the methods of FIGS. 12 and 13.

FIG. 14 shows a variant of the precepts according to the FIG. 12 or 13 according which, after having assembled a certain number of complementary fabrics with a preform according to the present disclosure, binds between these different members are performed by stitchings such as for example according to "tufting" or "stitching" methods.

More generally, it should be understood that the present disclosure extends to all combinations of previously exposed variants: it is thus possible to consider any number of layers of fabrics whose warps are bound therebetween at least partially in the lateral portions of the preform, or even possibly in the core of the preform, combined with any number of fabric layers attached by draping, stitching or interlocking (in the case of a fabric itself obtained by contour weaving).

It will be also noted that, in the above, attention was given to describe a preform adapted for a stiffener intended to be placed in the concavity of a bent part to be reinforced. The same variants can also be applied to a stiffener disposed protruding from the convex face of a bent part to be reinforced.

In general, the present disclosure thus allows making in a simple and efficient manner, with a per se well known industrial contour weaving method, a preform comprising a good bonding between the sole and its core, thus inhibiting any peeling phenomenon.

Furthermore, this method may be automatically performed, with reduced costs and a good repeatability of the obtained result.

This method is in particular adapted for making stiffeners for bent parts of turbojet engine nacelles intended for aircrafts.

In particular concave face circumferential stiffeners are in particular adapted to reinforce members of nacelles such as outer air inlet shrouds, outer cowls of nacelles, outer cowls of cascade thrust reversers or outer members of shrouds and of doors for a thrust reverser with doors. They can also be used for bent panels or shrouds of aircrafts such as fuselage members, fuselage door members.

Convex face stiffeners are in particular adapted to reinforce propulsive assembly axisymmetric members such as inner air inlet shrouds, the fan casings of turbojet engines, intermediate or rear casings of turbojet engine and more generally axisymmetric casings.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A preform woven by shape weaving, the preform having an omega-shaped section comprising a core in the form of a round portion and a sole in the form of an extended base, wherein at least one portion of said core comprise weft yarns and at least one portion of said sole comprise weft yarns, the weft yarns of said core and the weft yarns of said sole intersect on common warp yarns; and wherein weft yarns of said core form an angle different from 90° with at least one portion of warp yarns of said core.

2. The preform according to claim 1, wherein the weft yarns of the sole bind warp yarns of lateral portions of the sole to warp yarns of a central portion of the sole, and the weft yarns of the core bind said warp yarns of the lateral portions of the sole to the warp yarns of a central portion of the core.

3. The preform according to claim 1, wherein at least a portion of the weft yarns of the sole bind a warp sheet of lateral portions of the sole to warp yarns of a central portion of the core, and another portion of the weft yarns of the sole bind warp sheets of lateral portions of the sole to warp yarns of a central portion of the core.

4. The preform according to claim 1, wherein at least a portion of the weft yarns of the sole bind at least one warp sheet of lateral portions of the sole to at least one warp sheet of central portions of the sole, and another portion of weft yarns of the sole bind warp sheets of the sole to warp yarns of a central portion of the core.

5. The preform according to claim 1, wherein the core comprises a superposition of fabrics having warp sheets that are at least partially bound therebetween.

6. The preform according to claim 1, wherein the sole comprises a superposition of fabrics having warp sheets that are at least partially bound therebetween.

7. The preform according to claim 1, wherein the core comprises a superposition of fabrics attached to each other by interlocking of correspondingly shaped fabrics.

8. The preform according to claim 1, wherein the sole is formed of two portions separated from each other.

9. The preform according to claim 8, wherein the two portions are separated from each other so as to define a slot.

10. The preform according to claim 1, wherein the sole is formed of two portions that partially overlap.

11. The preform according to claim 1, wherein the core is located in a concave portion of said preform.

12. The preform according to claim 1, wherein the core is located on a convex portion of said preform.

13. The preform according to claim 1, wherein at least one of the sole and the core, further comprises a superposition of fabrics attached to each other by draping.

14. The preform according to claim 13, wherein at least a portion of the fabrics and the preform are bound by stitchings.

15. A stiffener obtained by resin impregnation, then baking, of the preform of claim 1.

16. A method for manufacturing a preform according to claim 1, wherein the preform is made by contour weaving on a lap roller having a groove or an outgrowth allowing shape weaving of the core and the sole of the preform.

17. The manufacturing method according to claim 16, wherein sides of said preform are tightened in order to reduce a width of the preform, while increasing a winding diameter of said core and said sole.

18. The manufacturing method according to claim 16 for making a preform having the sole formed of two portions separated from each other, wherein the sole is cut at an output of a shuttle loom in order to form a central slot.

19. The manufacturing method according to claim 16 for making a preform having the sole formed of two portions separated from each other, wherein the sole is made by at least two additional lateral warp sheets unbound from weft yarns of the core of the preform, then lateral portions of the core are unpleated to a center of the preform.

20. A plate for an aircraft nacelle reinforced by at least one stiffener in accordance with claim 15.

* * * * *